United States Patent

Torrey

[15] 3,636,317

[45] Jan. 18, 1972

[54] MACHINE READABLE CODE TRACK

[72] Inventor: Bradford M. Torrey, Carlisle, Mass.

[73] Assignee: Charecogn Systems, Inc., Allston, Mass.

[22] Filed: Apr. 28, 1969

[21] Appl. No.: 819,760

[52] U.S. Cl. ..................235/61.12 N, 235/61.11 E, 250/227
[51] Int. Cl. ....................G02b 5/14, G06k 7/10, G06k 19/00
[58] Field of Search .....................235/61.12, 61.11, 61.11 E; 340/146.3 RR, 146.3 ID, 149 A; 250/219 D, 219 DC, 219 DD

[56] References Cited

UNITED STATES PATENTS

| | | | |
|---|---|---|---|
| 3,211,470 | 10/1965 | Wilson | 235/61.12 |
| 3,409,760 | 11/1968 | Hamisch | 235/61.12 |
| 3,414,731 | 12/1968 | Sperry | 250/219 Q |
| 3,418,456 | 12/1968 | Hamisch et al. | 235/61.11 E |
| 3,458,706 | 7/1969 | Ravenhall et al. | 250/219 D |
| 3,474,234 | 10/1969 | Rieger et al. | 250/219 Q X |
| 3,497,239 | 2/1970 | Buhrer | 250/219 D |
| 3,502,850 | 3/1970 | Lindquist et al. | 235/61.11 E |

*Primary Examiner*—Maynard R. Wilbur
*Assistant Examiner*—Thomas J. Sloyan
*Attorney*—Louis Orenbuch

[57] ABSTRACT

Encoded information is contained in a circular track having sector patterns formed by abutting segments. The segments are all of equal angular extent and extend around the track with each sector containing the same number of segments. Each segment has a binary value and the sequence of binary segments in a sector represents the encoded information. Each different sequence can, for example, represent a different decimal numeral. An encoded "start" sector is employed that is not duplicated by any sequence of segments that can occur from assembling the decimal coded sectors in any order whatsoever. The circular track is thereby assured of containing within it only one "start" pattern regardless of the other information encoded in the track. The sector codes are chosen so that when the sectors are assembled in abutting relation, no more than two like valued segments occur in succession in the track. The transitions between differently valued segments provide the timing information for decoding the markings.

6 Claims, 16 Drawing Figures

INVENTOR
BRADFORD M. TORREY
BY
Louis Orenbuch
ATTORNEY

INVENTOR
BRADFORD M. TORREY
BY
Louis Orenbuch
ATTORNEY

| | | SECTOR BINARY CODE | SECTOR PATTERN CODE |
|---|---|---|---|
| FIG. 3A | START | 01001101 |  |
| FIG. 3B | DECIMAL 0 | 01010101 |  |
| FIG. 3C | DECIMAL 1 | 10010101 |  |
| FIG. 3D | DECIMAL 2 | 01100101 |  |
| FIG. 3E | DECIMAL 3 | 10100101 |  |
| FIG. 3F | DECIMAL 4 | 01010110 |  |
| FIG. 3G | DECIMAL 5 | 10010110 |  |
| FIG. 3H | DECIMAL 6 | 01100110 |  |
| FIG. 3I | DECIMAL 7 | 10101010 |  |
| FIG. 3J | DECIMAL 8 | 01011001 |  |
| FIG. 3K | DECIMAL 9 | 10011001 |  |
| FIG. 3L | SURPLUS | 01011010 |  |
| FIG. 3M | SURPLUS | 10110010 |  |
INVENTOR
BRADFORD M. TORREY
BY Louis Orenbuch
ATTORNEY

MACHINE READABLE CODE TRACK

This invention relates in general to code markings of the kind intended to be read by a machine. More particularly, the invention concerns a code marking arrangement which can be rapidly and accurately read by a simple scanning device.

BACKGROUND OF THE INVENTION

Retail merchandising has, in recent times, shown a marked trend toward the self-service type of operation where the customer selects wares from open shelves and cases and takes the selected merchandise to a checkout station. Each item usually has its price marked upon it directly or upon an attached tag or label. At the checkout station, an attendant enters the prices of the individual items in a cash register. The cash register is employed to obtain the total value of the items sold and acts as a depositary for the money collected. The cash register, in addition, may be of the type that produces a printed record of the transaction. The printing cash registers usually provide a printed record that is given to the customer and a printed duplicate that is retained in the register. The duplicate is used by the market as a record and is usually balanced against cash receipts. With few exceptions, only the prices of the items are entered in the register. The printed cash register sales records usually do not identify the items that are sold, which precludes the use of those records for inventory purposes.

The idea of using merchandising tags that can be read by a machine at the checkout station has been suggested as a means to facilitate the checkout procedure, provide detailed information as to the identity of the items sold, and avoid errors caused by the attendant misreading the price or entering the wrong price in the register. Many of the machine readable tags which have been proposed for such use require the tag to be precisely aligned with the reader to insure accurate reading of the data on the tag. Self-service markets are characterized by their high volume of sales and rapid movement of the goods through the checkout stations is essential to efficient operation and the maintenance of customer goodwill. Tags which require precise alignment with a mechanized reader have not been widely used in retail sales operations because the checkout procedure is slowed to an intolerable extent. Efforts to overcome the precise alignment problem have resulted in highly complex mechanized readers or in tags that are inordinate in size.

DISCUSSION OF THE PRIOR ART

Machine readable merchandising tags are known which have encoded information in a circular track. A tag of that kind is shown, for example, in U.S. Pat. No. 3,409,760. Such tags employ a second circular track containing timing marks and also utilize a "start" mark in a third track. To ensure proper alignment of the reader, the tag has a hole into which a guide member on the reader is inserted. Because of the alignment problem, the coded information cannot be printed directly upon most merchandise in a super market since the packages or containers must remain imperforate.

The primary objective of the invention is to provide machine readable information in a form that can be marked directly upon the merchandise or which can be upon a label or tag attached to the merchandise without requiring the label, tag or marking to have any means for assuring precise alignment of the reader. The invention resides in a circular track containing within it information encoded in a form which is self clocking, provides a distinctive "start" pattern, and enables the reader to operate successfully despite imprecise alignment.

THE DRAWINGS

The invention, both as to its arrangement and the manner of using it, can be better understood from the following exposition when considered in conjunction with the accompanying drawings in which:

FIG. 3A illustrates a preferred sector "start" code;

FIGS. 3B to 3K illustrate preferred sector codes for representing decimal information;

FIGS. 3L and 3M show preferred sector codes for representing additional information.

Figure 1:
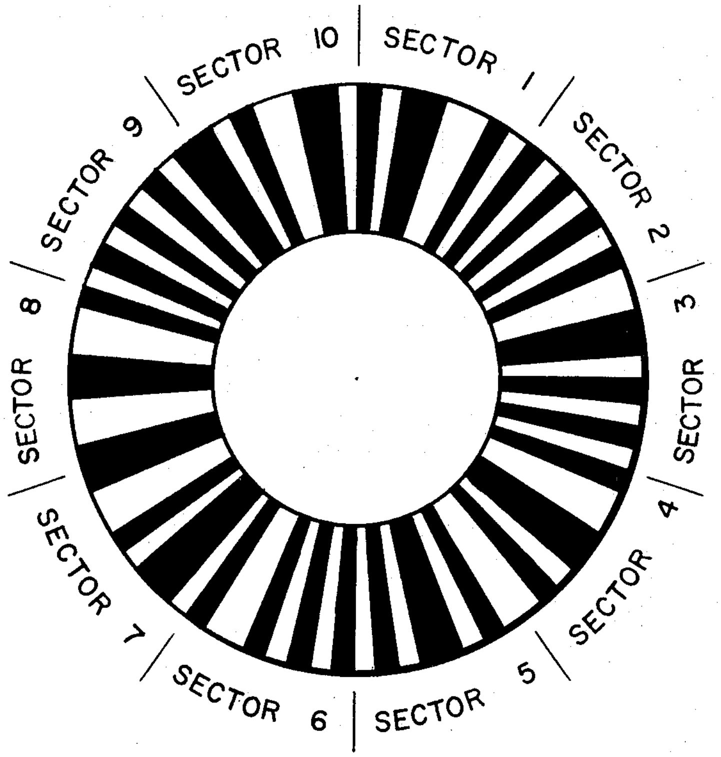
FIG. 1 depicts a circular track encoded in accordance with the invention.

Referring now to FIG. 1, there is shown an encoded track 1 having alternating black and white segments forming a ring. The ring is divided into ten sectors, each sector covering an arc of 36° and having in it a group of eight segments. The segments are of equal extent and each segment covers an arc of 4.5°. Nine of the sectors are encoded so that each sector can represent any one of the 10 decimal numerals 0, 1, 2,...8, 9. The remaining sector is used to provide a "start" code, which has its group of segments arranged in a pattern that is not duplicated by any sequence of eight successive segments in the 324° arc over which the other nine sectors extend. That is, the "start" pattern of the 10th sector is different from the patterns of the other nine sectors and is not duplicated by any sequence of eight successive segments which can be formed by assembling the other nine sectors in any order whatsoever. A machine reader, on scanning the circular track, is able to detect the "start" pattern as that pattern can only occur once in any 360° scan of the track regardless of the sequence of decimal information encoded on the track.

The segments are here illustrated as being black and white merely for the convenience of exposition. The segments must have two states that are discernable to the machine reader. Depending upon the ability of the reader to differentiate between the two states, the states can be represented by a fluorescent segment and a nonfluorescent segment, by a rough surface and a smooth surface, by a magnetic segment and a nonmagnetic segment, etc. In this instance, black has been chosen to represent one state and white to represent the other state. Upon illuminating the track, light is reflected from the white segments and is absorbed by the black segments. A machine reader is arranged to scan the circular track and transmit the reflected light to a photocell. The scanner is thereby able to differentiate a black segment from a white segment.

Figure 2:
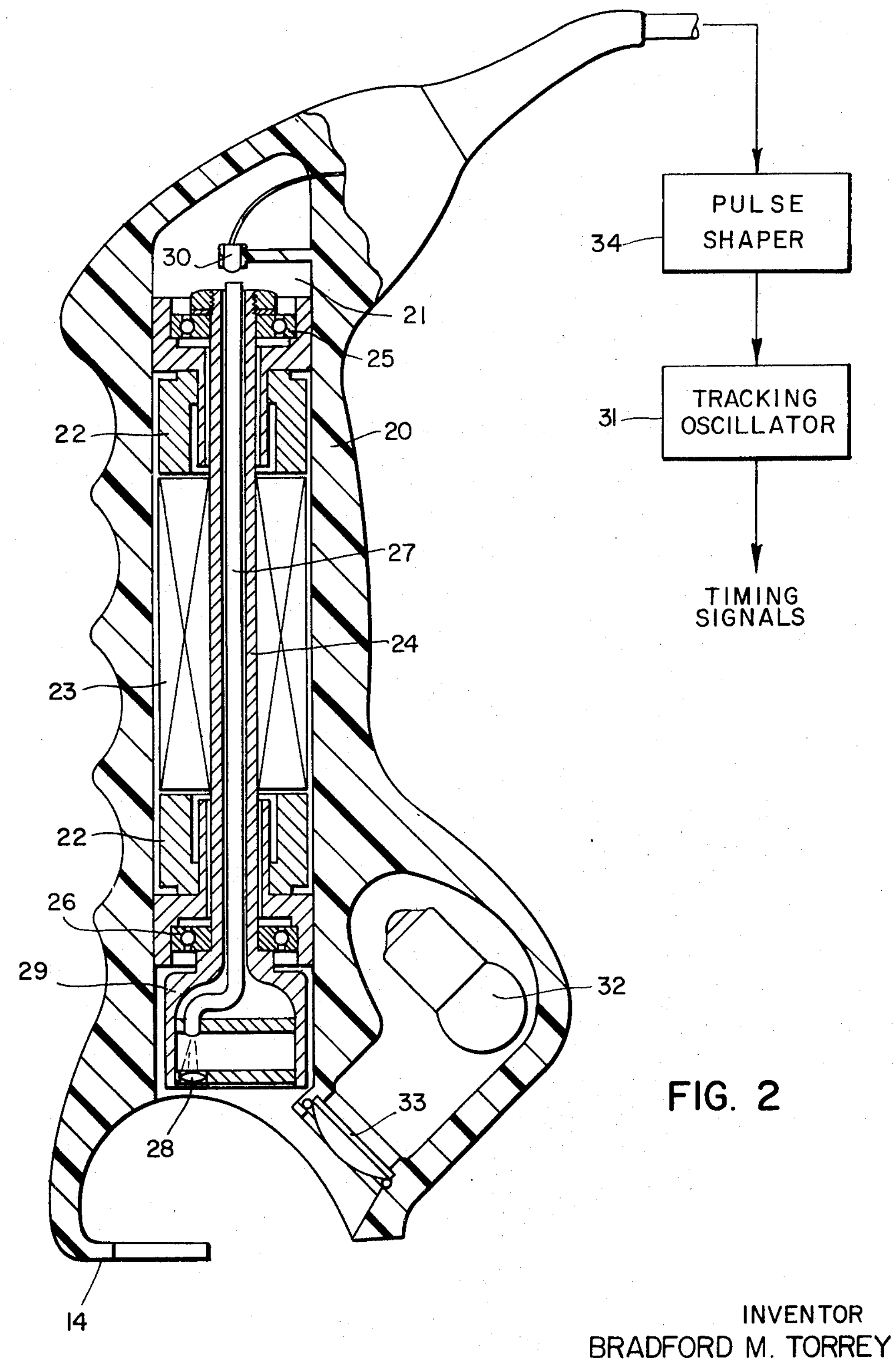
FIG. 2 shows a mechanism for reading the encoded circular track.

A suitable scanning device is depicted in FIG. 2. The housing of the scanner is in the form of a handle 20 having a cylindrical chamber 21 in which is fixed the stator 22 of an electric motor. The armature 23 of the motor is secured upon a shaft 24 supported in bearings 25 and 26. Preferably the electric motor is of the constant speed type and a synchronous motor of the hysteresis type has been found to be suitable for this application. The shaft has a central bore extending through it in which is situated a bundle 27 of light-transmitting fibers. Such bundles of light-transmitting fibers are termed "fiber optic" bundles and are characterized by the ability to efficiently transmit light along the bundle even where the bundle constitutes a highly nonlinear path. The lower end of the fiber optic bundle is extended and offset from the motor's axis. A lens 28 is mounted in an adapter 29 that is secured to the shaft. The lens focuses light reflected from the tag upon the aligned end of the fiber optic bundle. The light transmitted through the fiber optic bundle is directed upon a photocell 30 which responds to the light by providing an electrical signal that is substantially proportional to light intensity.

The output of the photocell is processed by conventional amplifying and pulse shaping electronic apparatus 34 to derive synchronizing signals from the transitions between segments of complementary values. The synchronizing signals are employed to govern the frequency of a tracking oscillator 31 which provides timing signals for reading the encoded track. To illuminate the track, the reader is provided with a lamp 32 that projects a beam through a collimating lens 33. In the discussion herein it is assumed that the reader scans the track in the clockwise direction. That is, looking down upon the coded track of FIG. 1, it is assumed that the scan of the reader proceeds in the clockwise direction. With reference to the sector codes shown in FIGS. 3A to 3N, the sequence of segments would be reversed where a reader is employed that scans in the counterclockwise direction.

FIGS. 3A to 3K show sectors encoded to represent the "-start" pattern, and the decimal numbers 0, 1, 2,...9. FIGS. 3L and 3M depict sector codes which are excess to a decimal system but can be used where more than 11 unique code patterns are needed. Each sector has four white and four black segments. The black segment represents one binary value and the white segment represents the complementary binary value. In binary parlance, assuming the black segment is a binary ZERO, the white segment is a binary ONE. The start pattern in binary notation is 01001101 and the binary notation for the other code patterns are shown in the drawings. It will be observed that a segment boundary exists whenever a transition occurs between one binary value and its complement. However, when a binary ONE is followed by another ONE, or a binary ZERO is succeeded by another ZERO, no transition occurs to mark the border between the two segments. The code is constructed so that within each sector no more than two binary segments of the same value occur in succession. Further, it is preferred that none of the sector patterns start or end with a like valued pair of segments. In FIGS. 3A to 3M, it can be seen that the first two segments of any sector are of complementary values and that the last two segments are also of complementary values. Since no sector pattern starts or ends with a like valued pair of segments, the sectors can be assembled in any sequence whatsoever without causing more than two like segments to be contiguous. The same result can be obtained by having all sector patterns begin with a segment of the same binary value and end with a segment of the complementary value. For example, all sector patterns may start with a black segment and end with a white segment. However, the number of useful code patterns is reduced if all sectors must start with a segment of the same binary value and it is therefore preferred to have the code patterns start with a segment that can be of either value provided it is followed by a segment of the complementary value as in FIGS. 3A to 3M. The property of the code patterns that prevents more than two like values segments from being in succession when the sectors are assembled to form the track is useful in determining the boundary between adjacent segments of the same value. That is, it is contemplated that the reading apparatus will employ a tracking oscillator that is pulled into synchronism with the signals derived from the transitions between segments of complementary values. The occurrence of the boundary between segments of the same value, is therefore anticipated by the oscillator. Assuming the tracking oscillator can change frequency only at a slow rate, the error in anticipating a boundary between like valued segments cannot be large because no more than two like valued segments occur in succession anywhere in the track. That is, the interval between synchronizing signals is not long enough to permit the oscillator to make a gross error in predicting the boundary between like valued segments. With such a reader, the coded patterns are self-clocking in that the transitions between segments of complementary values provide the timing information required to permit the code to be read.

While it is apparent from FIGS. 3A to 3M that the sector code patterns differ from one another and from the "start" pattern, it is not apparent that the start pattern is unique in that it cannot be duplicated within any combination of the sector patterns in FIGS. 3B to 3M regardless of the order in which those sector patterns are arranged. That is, the "start" code pattern of FIG. 3A is not duplicated by any sequence of successive segments that can occur from assembling the decimal code patterns in any order whatsoever. When the scanner moves over the circular track, the "start" pattern can occur only once in any 360° scan. The "start" pattern marks the beginning of an encoded number sequence and its reoccurrence marks the end of that sequence. Thus, the reading apparatus can be arranged to accept information read from the track only where the "start" pattern reoccurs within a time interval that has a precise relation to the scanning speed.

Figure 4:
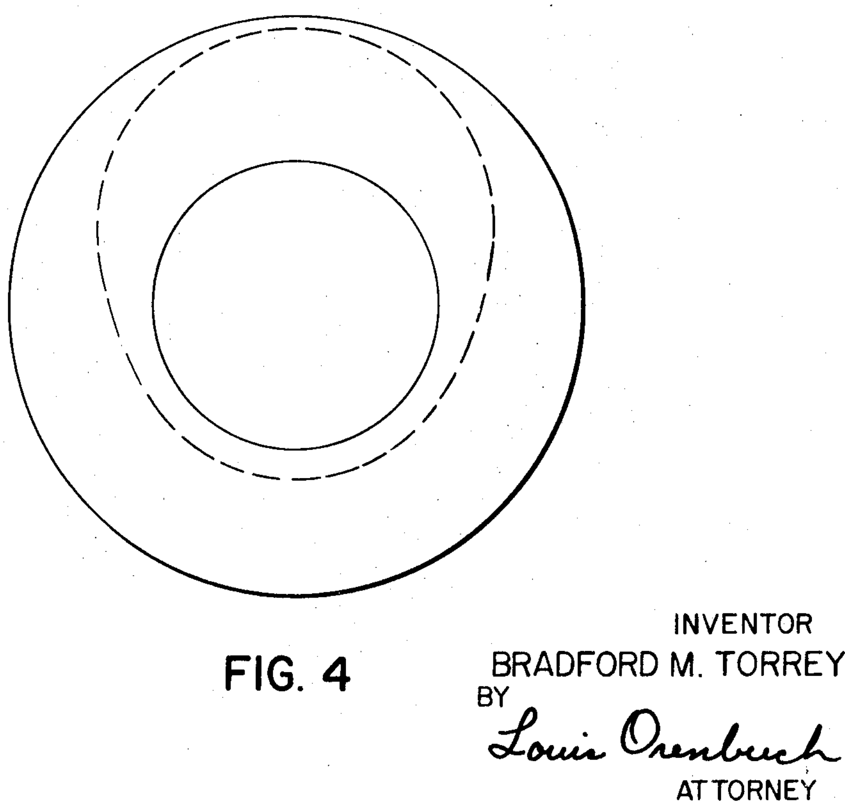
FIG. 4 depicts the scan path of a tilted misaligned reader.

In the ideal situation, the reader is positioned to scan a circular path that is concentric with the coded track. However, ideal positioning of the reader is not a requirement and appreciable departure from the ideal can be tolerated without disrupting the effectiveness of the scan. Where, for example, the reader is tilted relative to the plane of the code pattern, the scanning path, as shown in FIG. 4, is ovoid rather than circular. Despite the misalignment, the information can be correctly read so long as the scan does not run off the track within a 360° sweep. Where the reader employs a constant speed motor, misalignment between the plane of the code and the reader results in an approximately sinusoidal frequency modulation of the rate at which the scan crosses the segment borders. The scan path in FIG. 4 illustrates an extreme case of misalignment. Assuming the reader scans the track at a rate of 1,800 revolutions per minute and the circular track contains 80 segments, the rate at which the scan crosses the segments varies approximately sinusoidally from 1,600 to 3,200 sectors per second where the ratio of the outer diameter of the track to the inner diameter is two to one.

The tracking oscillator in the reading apparatus provides the timing signals to indicate when the scan crosses the border between adjacent segments. In order to determine which crossings constitute the boundaries between sectors, the reader must locate the "start" pattern. The "start" pattern is immediately followed by a sector boundary and the other sector boundaries can be located by counting the timing signals. Once the sector boundaries are ascertained, the received signals can be readily decoded by conventional apparatus.

The sector pattern can, of course, be assigned meanings other than decimal significance. The number of segments forming a sector can be increased to increase the number of usable patterns. For example, where the sector patterns are to represent the letters of the alphabet in addition to the decimal numbers, each sector may have as many as 12 segments.

By assigning to the eight segment sector code patterns the decimal significance as tabulated below, an additional desirable feature is obtained which permits ready conversion of the sector code into the conventional 8421 binary decimal code.

| | Sector pattern code | | | | | | | | Conventional 8421 binary coded decimal | | | |
|---|---|---|---|---|---|---|---|---|---|---|---|---|
| Column No. | 0 | 1 | 2 | 3 | 4 | 5 | 6 | 7 | 3 | 2 | 1 | 0 |
| Decimal No.: | | | | | | | | | | | | |
| 0 | 0 | 1 | 0 | 1 | 0 | 1 | 0 | 1 | 0 | 0 | 0 | 0 |
| 1 | 1 | 0 | 0 | 1 | 0 | 1 | 0 | 1 | 0 | 0 | 0 | 1 |
| 2 | 0 | 1 | 1 | 0 | 0 | 1 | 0 | 1 | 0 | 0 | 1 | 0 |
| 3 | 1 | 0 | 1 | 0 | 0 | 1 | 0 | 1 | 0 | 0 | 1 | 1 |
| 4 | 0 | 1 | 0 | 1 | 0 | 1 | 1 | 0 | 0 | 1 | 0 | 0 |
| 5 | 1 | 0 | 0 | 1 | 0 | 1 | 1 | 0 | 0 | 1 | 0 | 1 |
| 6 | 0 | 1 | 1 | 0 | 0 | 1 | 1 | 0 | 0 | 1 | 1 | 0 |
| 7 | 1 | 0 | 1 | 0 | 1 | 0 | 1 | 0 | 0 | 1 | 1 | 1 |
| 8 | 0 | 1 | 0 | 1 | 1 | 0 | 0 | 1 | 1 | 0 | 0 | 0 |
| 9 | 1 | 0 | 0 | 1 | 1 | 0 | 0 | 1 | 1 | 0 | 0 | 1 |

Columns 1, 3, 5, 7 in the sector patterns are the modulo 2 complements of the columns 0, 2, 4, 6 respectively. This arrangement prevents more than two like valued segments from appearing in succession within any sector pattern. Further, the code sequence in columns 0, 2, 6 of the sector code are identical to columns 0, 1, 2 of the conventional binary code. Column 4 of the sector code is identical to column 3 of the conventional code with the exception of the representation for decimal number 7. The conversion from the sector code to the commonly used conventional 8421 binary decimal format can be direct, except for the decimal 7, merely by selecting the even-numbered columns of the sector code. The decimal sector 7 pattern can be converted to the conventional code using only the even numbered columns of the sector code by changing the bit in column 4 to a ZERO whenever columns 0, 2, 6 all exhibit a ONE.

The employment of an equal number of black and white segments in the sector codes make it difficult to surreptitiously alter the code since the reader can be arranged to reject any reading in which the number of black and white segments is not equal. Further detection of inadvertent alteration of the code by scuffing or smearing of the track is rendered highly probable since it is not likely that a black and a white segment in the same sector would both be changed in a manner that would make the resultant altered pattern conform to one of the accepted code patterns.

If desired, the decimal numbers corresponding to the sector codes can be printed on the tag to provide humanly readable information in the event that the machine is readable code markings are obliterated or the reader fails to accurately read the track.

It is contemplated, where the code markings are employed in a super market, that the reader will be manually held by an attendant who will position the reader so that it can scan the track. The collimated light beam from the reader's lamp 32 (FIG. 2) aids the attendant in positioning the reader. As the reader preferably scans at a rate of about 30 revolutions per second, the reader need be in rough alignment with the track for only a fraction of a second to obtain a reading of the entire track. Of course, "sighting" apparatus to facilitate positioning of the reader can be employed. HOwever, an experienced attendant can rapidly position the reader, replying upon his naked sight and the collimated beam alone.

"Computer" apparatus utilizing the signals from the reader can be programmed to reject any code that does not correspond to the start code or to one of the decimal codes. Further, the code track may utilize one sector to provide a parity decimal to provide a check by the computer on the accuracy of the reader in addition to the requirement that the signals from the reader correspond to equal numbers of black and white segments.

A detailed description has been set forth of a preferred embodiment of the invention. It is evident to those skilled in the art of mechanized information storage and retrieval, that the invention can be embodied in other form without departing from its essential nature. For example, where more information is to be encoded than can be carried in a single track, it is evident that one or more concentric information tracks can be added and that the "start" for all tracks can be obtained from the "start" pattern in the basic track. Further, the segments in an added track can be different in arcuate extent from the segments in the basic track to permit more information to be carried in the track of large diameter. Where the same tracking oscillator is used for all tracks, the arcuate extent of a segment in one track must be related to the arcuate extent of the segment in another track in the same ratio as some multiple or sub multiple of the tracking oscillator frequency has to the primary oscillator frequency.

Because of the varied forms that the invention can take, it is intended that the appended claims cover those forms that do not fairly depart from the essential aspects of the invention.

I claim:

1. An article having on it a machine readable, binary coded circular track formed by abutting segments, each segment being coded to have only one or the other of the two binary values whereby the same binary value exists throughout the entire area of the segment, the radial extent of the segment constituting the full width of the track, the abutting segments all being of equal angular extent, the coded track being divided into abutting sectors of equal angular extent whereby each sector has a like plurality of the arcuate segments, each sector having in it segments of both binary values, no more than two like valued segments abutting in succession in any sector, encoded information being represented by the sequence of segments in a sector, and one of the sectors having a start code sequence of segments that is not duplicated within the circular track by any sequential arrangement of the other sectors whatsoever.

2. An article having on it the machine readable, binary coded circular track according to claim 1, further characterized in that self-clocking information is provided in the track by having no more than two like valued segments abut in succession in the encoded track.

3. An article having on it the self-clocking, machine readable, binary coded circular track according to claim 1, further characterized in that any sequential arrangement of the sectors whatsoever places no more than two like valued segments in succession in the track.

4. An article having on it the self-clocking, machine readable, binary coded circular track according to claim 3, further characterized in that the coded sectors begin with two segments of complementary values and end with two segments of complementary values.

5. An article having on it the self-clocking, machine readable, binary coded circular track according to claim 1, further characterized in that the same ratio of segments of one value to segments of the complementary value is present in each encoded sector.

6. An article having on it the self-clocking, machine readable, binary coded circular track according to claim 5, wherein the ratio is one to one.

* * * * *